United States Patent
Lee et al.

[11] Patent Number: 6,163,423
[45] Date of Patent: Dec. 19, 2000

[54] SYNCHRONIZING SIGNAL DETECTOR FOR MAGNETIC RECORDING/REPRODUCING APPARATUS AND SYNCHRONIZING SIGNAL DETECTING METHOD THEREOF

[75] Inventors: Sang-Mun Lee, Seoul; Doo-Hee Lee, Kyungki-do, both of Rep. of Korea

[73] Assignee: LG Electronics Inc., Seoul, Rep. of Korea

[21] Appl. No.: 08/991,623

[22] Filed: Dec. 16, 1997

[30] Foreign Application Priority Data

Dec. 16, 1996 [KR] Rep. of Korea .................. 96-66225

[51] Int. Cl.[7] .................................................. G11B 5/09
[52] U.S. Cl. .......................................................... 360/51
[58] Field of Search ................... 360/51; 369/59; 348/525; 386/48; 375/368

[56] References Cited

U.S. PATENT DOCUMENTS

| | | | |
|---|---|---|---|
| 3,648,237 | 3/1972 | Frey, Jr. et al. | 340/146.1 |
| 4,275,466 | 6/1981 | Yamamoto | 360/51 |
| 5,696,867 | 12/1997 | Lee | 360/51 |
| 5,712,741 | 1/1998 | Lee | 360/51 |
| 5,757,869 | 5/1998 | Sands et al. | 375/366 |

*Primary Examiner*—W. Chris Kim

[57] ABSTRACT

A synchronizing signal detector for a magnetic recording/reproducing apparatus includes a first comparator for comparing a given synchronizing signal pattern with externally input data in a certain bit unit and outputting the number of the same bits in each of comparison unit, a detecting portion for detecting a maximum value of the outputs of the first comparator, and a signal processor for outputting data corresponding to a position where the maximum value from the detecting portion occurs primarily, as a synchronizing signal. In the synchronizing signal detector for a magnetic recording/reproducing apparatus, since the position where the synchronizing signal is generated is detected by comparing the synchronizing signal pattern with the input data, the synchronizing signal detecting error occurs scarcely, thereby improving reliability of the detected synchronizing signal.

10 Claims, 5 Drawing Sheets

FIG.4A
FIG.4B
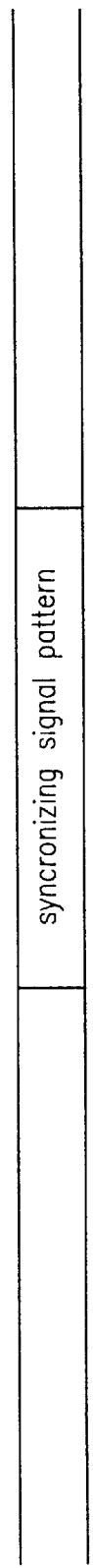
syncronizing signal pattern
FIG.4C
FIG.4D

SYNCHRONIZING SIGNAL DETECTOR FOR MAGNETIC RECORDING/REPRODUCING APPARATUS AND SYNCHRONIZING SIGNAL DETECTING METHOD THEREOF

BACKGROUND OF THE INVENTION

1. Field of the Invention

The present invention relates to a magnetic recording/reproducing apparatus and more particularly, to a synchronizing signal detector for a magnetic recording/reproducing apparatus and a synchronizing signal detecting method thereof.

2. Discussion of the Related Art

A synchronizing signal detector for a magnetic recording/reproducing apparatus according to the background art will be described with reference to the accompanying drawings.

FIG. 1 is a block diagram illustrating a synchronizing signal detector for a magnetic recording/reproducing apparatus according to the background art. FIG. 2a is a timing chart illustrating waveforms of input data of FIG. 1. FIG. 2b is a timing chart illustrating output waveforms of a window signal generator of FIG. 1. FIG. 2c is a timing chart illustrating output waveforms of a signal generator of FIG. 1.

As shown in FIG. 1, the synchronizing signal detector for a magnetic recording/reproducing apparatus according to the background art includes a controller 11 for controlling the overall system, a window signal generator 12 for generating a window signal in response to a control signal of the controller 11, a shift register 13 for shifting externally input data, a comparator 15 for comparing its own synchronizing signal pattern with sequentially input data shifted by the shift register 13 as much as bits of the synchronizing signal pattern when the window signal of the window signal generator 12 is low and for outputting a certain signal if the synchronizing signal pattern is the same as the data, and a synchronizing signal generator 16 for generating a synchronizing signal in response to the signal output from the comparator.

The synchronizing signal pattern 14 is a synchronizing signal of a certain bit rate, having a pattern set to match the synchronizing signal of externally input data. The window signal is a reference signal for setting a synchronizing signal detecting block.

The operation of the synchronizing signal detector for a magnetic recording/reproducing apparatus will be described below.

If data is input as shown in FIG. 2a, the comparator 15 compares the synchronizing signal pattern 14 with data from the shift register 13 as much as the number of bits of the synchronizing signal pattern when the window signal output from the window generator 12 is low, as shown in FIG. 2b. Subsequently, if the same data as the synchronizing signal pattern is input, a certain signal is applied to the synchronizing signal generator 16 to generate the synchronizing signal, as shown in FIG. 2c.

The synchronizing signal detector for a magnetic recording/reproducing apparatus according to the background art has a problem. That is, as shown in FIG. 2c, high edge of a normal synchronizing signal is generated in "A" and "D" positions. However, the synchronizing signal is not generated as shown in "B" position or two high edges are generated as shown in "C" position due to data degradation, thereby causing data processing error.

SUMMARY OF THE INVENTION

Accordingly, the present invention is directed to a synchronizing signal detector for a magnetic recording/reproducing apparatus and a synchronizing signal detecting method thereof that substantially obviate one or more of the problems due to limitations and disadvantages of the related art.

An object of the present invention is to provide a synchronizing signal detector for a magnetic recording/reproducing apparatus and a synchronizing signal detecting method thereof, which minimize a synchronizing signal detecting error.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a synchronizing signal detector for a magnetic recording/reproducing apparatus includes a comparison part for comparing a given synchronizing signal pattern with externally input data in a certain bit unit and outputting the number of bits that are the same in each comparison unit, a detecting part for detecting a maximum value of the outputs of the first comparator, and a signal processor for outputting a synchronizing signal by data corresponding to a position where the maximum value from the detecting portion occurs primarily.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4a is a timing chart illustrating output waveforms of a window signal generator of FIG. 3;

FIG. 4b is a timing chart illustrating position of a synchronizing signal pattern of FIG. 3;

FIG. 4c is a timing chart illustrating output waveforms of a first comparator of FIG. 3;

FIG. 4d is a timing chart illustrating the output of a counter in a first comparator of FIG. 3;

FIG. 4g is a timing chart illustrating the output of a signal generator in response to the output of FIG. 4a.

DETAILED DESCRIPTION OF THE PREFERRED EMBODIMENTS

Reference will now be made in detail to the preferred embodiments of the present invention, examples of which are illustrated in the accompanying drawings.

Figure 1:
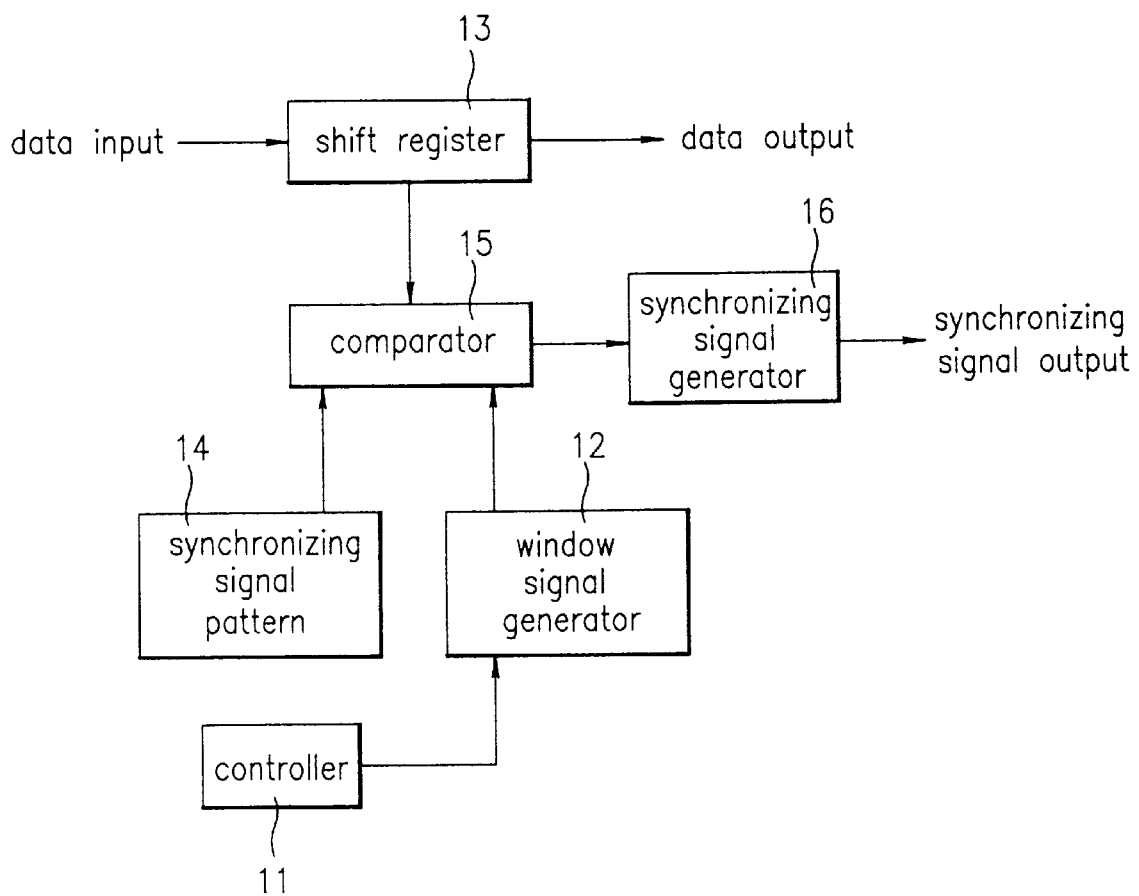
FIG. 1 is a block diagram illustrating a synchronizing signal detector for a magnetic recording/reproducing apparatus according to the background art.
Figure 2A:
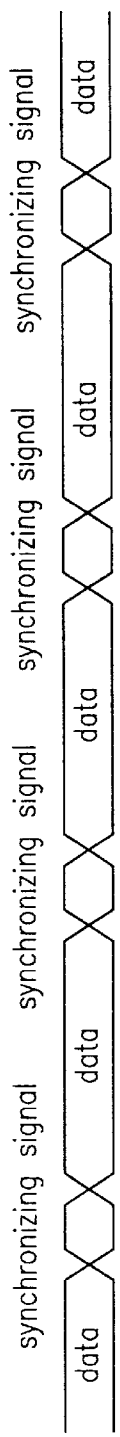
FIG. 2a is a timing chart illustrating waveforms of input data of FIG. 1.
Figure 2B:
FIG. 2b is a timing chart illustrating output waveforms of a window signal generator of FIG. 1.
Figure 2C:
FIG. 2c is a timing chart illustrating output waveforms of a signal generator of FIG. 1.
Figure 3:
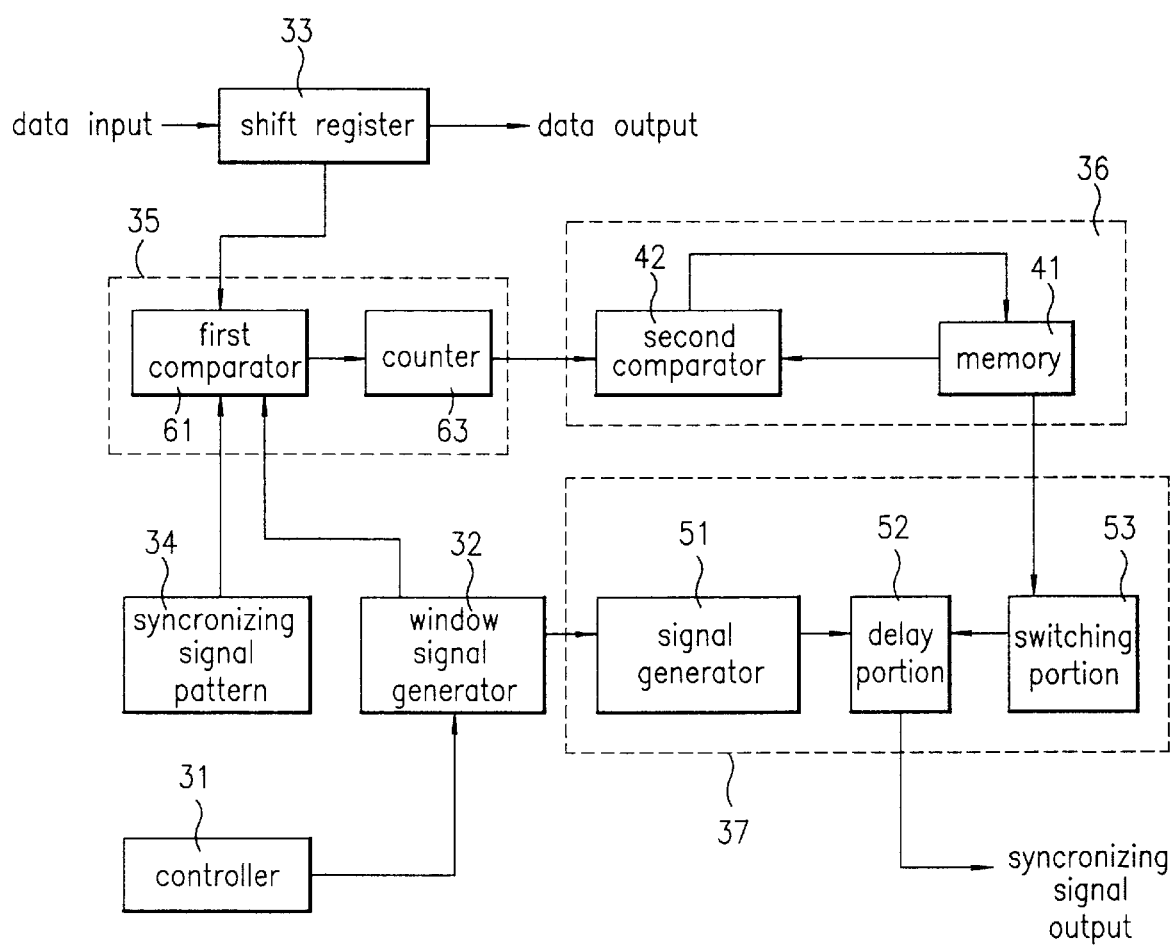
FIG. 3 is a block diagram illustrating a synchronizing signal detector for a magnetic recording/reproducing apparatus according to an embodiment of the present invention.

As shown in FIG. 3, a synchronizing signal detector for a magnetic recording/reproducing apparatus of an embodiment of the present invention includes a controller 31, a window signal generator 32, a shift register 33, a comparison part 35, a detecting part 36, and a signal processor 37.

The controller 31 controls the overall system. The window signal generator 32 generates a window signal in response to a control signal of the controller 31. The shift register 33 shifts externally input data. The comparison part 35 compares the given synchronizing signal pattern 34 with shifted import data from the shift register 33, as much as the number of bits of the synchronizing signal pattern 34, when the window signal of the window signal generator 32 is low. The comparison part 35 has a counter 63 for counting the number of the same bits when comparison is made and the number of times the comparison is performed. The detecting part 36 includes a memory 41 for storing a predetermined data and a second comparator 42 for comparing the comparison values sequentially output from the comparison part 35, in order to detect the synchronizing signal in response to the maximum value of the comparison values and to store the position value of the synchronizing signal in the memory 41.

The signal processor 37 indicates the end position of the window block by generating a predetermined signal when the window signal of the window signal generator 32 changes from low to high. At the same time, the signal processor 37 outputs a reference signal required to detect the synchronizing signal by delaying the reference signal for a certain time in response to the maximum value from the detecting part 36. In other words, the signal processor 37 includes a signal generator 51 for generating a predetermined signal when the window signal of the window signal generator 32 is changed from high to low, a delay portion 52 for delaying the output of the signal generator 51 in response to one of a plurality of delay time patterns, and a switching portion 53 for switching the delay time pattern corresponding to the output of the detecting portion 36.

The operation of the synchronizing signal detector for a magnetic recording/reproducing apparatus will be described below.

Externally provided data is input through the shift register 33. The first comparator 35 compares the given synchronizing signal pattern 34 with data input through the shift register 33 as much as bits of the synchronizing signal pattern, when the window signal is changed to low. In other words, the synchronizing signal detecting operation starts when the window signal goes low. The first comparator 35 outputs the number of the bits that are the same at the same and time starts to count using its counter as shown in FIG. 4d.

The number of the bits as being the same is determined as follows.

If the synchronizing signal pattern is 10111001 and the data input through the shift register 33 is 10101001, the comparison part 35 compares 10111001 (the synchronizing signal pattern) with 10101001 (data) in bit units. As a result, the comparison part 35 records a "1" for each bit of the synchronizing signal pattern that is the same as the corresponding bit of the data and records a "0" for each bit that is not the same as the corresponding bit of the data. Subsequently, the comparison part 35 sums up each of the values. In the example above, the comparison part 35 outputs a value "7". It is noted that 7 bits are the same while 1 bit is different. Further, 4, 2, 7, 8, 5, . . . shown in FIG. 4c represent the number of the same bits for different counting sessions, respectively.

Figure 4E:
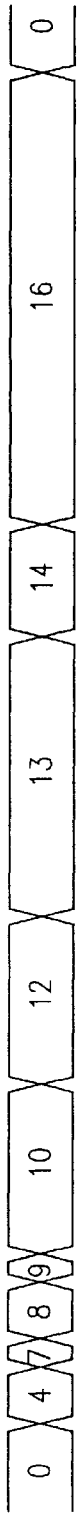
FIG. 4e is a timing chart illustrating data stored in a memory in response to the output of FIG. 4c.
Figure 4F:
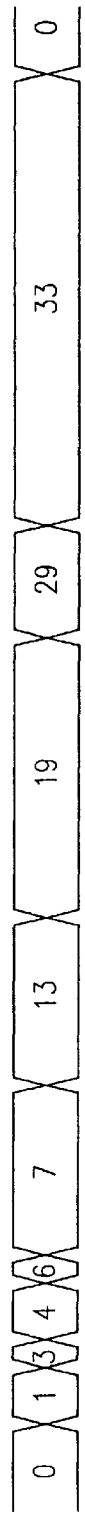
FIG. 4f is a timing chart illustrating data stored in a memory in response to the output of FIG. 4d.

Thereafter, as shown in FIG. 4e, the second comparator 42 compares the outputs of the comparison part 35 with the data stored in the memory 41. The detecting part 36 renews the data stored in the memory 41 to the greater of the two values. At the same time, as shown in FIG. 4f, the count value of the comparison part 35 corresponding to the renewed data in the memory 41 is stored.

In other words, if the outputs of the comparison part 35 are 4, 2, the data value to be stored in the memory 41 is maintained at originally stored data value "4" and the count value is maintained at "1". If the outputs of the first comparator 35 are 2, 7, the data to be stored in the memory 41 is renewed to 7 and the count value is renewed to 3.

Figure 4G:
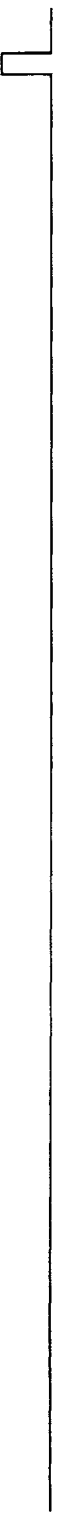

The operation of detecting the synchronizing signal continues until the window signal is changed to high. As shown in FIG. 4g, if the window signal is changed to high, the signal generator 51 generates a predetermined signal that indicates the end of the window block and at the same time generates a reference signal required to detect the synchronizing signal.

At this time, the count value represents a value finally stored in the memory 41. That is, the count value means the position where the maximum value is primarily generated and the position of the synchronizing signal at the same time.

Therefore, the switching portion 53 selects a delay time pattern from a plurality of delay time patterns, which delays the predetermined reference signal of the signal generator 51 as much as the position corresponding to the count value stored in the memory 41.

Figure 4H:
FIG. 4h is a timing chart illustrating the output of a delay portion of FIG. 3.

Subsequently, as shown in FIG. 4h, the delay portion 52 delays the predetermined reference signal generated by the signal generator 51 in response to the delay time pattern selected by the switching portion 53 and finally outputs the synchronizing signal.

At this time, the position of the synchronizing signal output from the delay portion 52 is the position where the synchronizing signal pattern 34 and the data are the same or most likely to be the same. Thus, if normal data is input, the position of the synchronizing signal is accurately detected, thereby generating the synchronizing signal therefor. Even if the input data is damaged, the position where the synchronizing signal is most likely to be disposed is detected, thereby generating the synchronizing signal therefor. As a result, the synchronizing signal detecting error occurs scarcely.

In the synchronizing signal detector for a magnetic recording/reproducing apparatus and the synchronizing signal detecting method thereof have the following advantages.

Since the synchronizing signal pattern and the data are compared with each other and the position, where the synchronizing signal is generated or the synchronizing signal is most likely to be generated, is accurately detected, the synchronizing signal detecting error caused by degradation of the externally input data is reduced or eliminated, thereby improving reliability of the detected synchronizing signal.

It will be apparent to those skilled in the art that various modifications and variations can be made in the synchronizing signal detector for a magnetic recording/reproducing apparatus and the synchronizing signal detecting method thereof according to the present invention without departing from the spirit or scope of the invention. Thus, it is intended that the present invention covers the modifications and variations of the invention provided they come within the scope of the appended claims and their equivalents.

What is claimed is:

1. A synchronizing signal detector for a magnetic recording/reproducing apparatus, comprising:

a synchronizing signal pattern generating part which generates a given synchronizing signal pattern;

a window signal generating part generating a window signal to detect a synchronizing signal of an input data;

a comparison part comparing the given synchronizing signal pattern with the input data in successive bit units according to the window signal, said comparison part outputting a number of corresponding bits between the given synchronizing signal pattern and the input data for each bit unit and outputting a bit unit number of the bit unit;

a detection part detecting a maximum value of the number of corresponding bits and detecting the bit unit number of the bit unit with the maximum value; and a signal processor outputting a synchronizing signal of the input data in response to the bit unit number of the bit unit with the maximum value.

2. The synchronizing signal detector for a magnetic recording/reproducing apparatus as claimed in claim 1, wherein the comparison part includes:

a first comparator comparing the given synchronizing signal pattern with the input data for each bit unit according to the window signal; and a counter counting the number of corresponding bits between the given synchronizing signal pattern and the input data for each bit unit and counting the bit unit number of each bit unit.

3. The synchronizing signal detector for a magnetic recording/reproducing apparatus as claimed in claim 1, wherein the detection part includes:

a second comparator comparing the outputs of the comparison part sequentially to detect the maximum value of the number of the corresponding bits and the bit unit number of the bit unit with the maximum value, and a memory storing the bit unit number of the bit unit with the maximum value.

4. The synchronizing signal detector for a magnetic recording/reproducing apparatus as claimed in claim 1, wherein the signal processor includes:

a signal generator generating a reference signal a delay portion delaying the reference signal for a delay time; and a switching portion setting the delay time of the delay portion in response to the bit unit number of the bit unit with the maximum value.

5. The synchronizing signal detector for a magnetic recording/reproducing apparatus as claimed in claim 4, wherein the delay portion has a plurality of delay time patterns in its memory.

6. A synchronizing signal detecting method for a magnetic recording/reproducing apparatus, comprising the steps of:

generating a given synchronizing signal pattern;

generating a window signal, comparing the given synchronizing signal with input data for each bit unit according to the window signal, and outputting a number of corresponding bits between the synchronizing signal pattern and the input data for each bit unit and a bit unit number of the bit unit;

detecting a maximum value of the number of corresponding bits and the bit unit number of the bit unit with the maximum value; and outputting a synchronizing signal of the input data in response to the bit unit number of the bit unit with the maximum value.

7. The method as claimed in claim 6, wherein the input data is input through a shift register.

8. The method as claimed in claim 6, wherein the step of detecting includes the steps of:

storing the number of the corresponding bits; and renewing the stored number to a greater number by comparing the corresponding bits numbers of successive bit units.

9. The method as claimed in claim 8, wherein the stored number is reset to "0" after a certain time.

10. A synchronizing signal detector for a magnetic recording/reproducing apparatus comprising:

a comparison part comparing a given synchronizing signal pattern with externally input data in bit units and outputting the number of corresponding bits for each bit unit, said comparison part including a counter performing counting operations for each bit unit;

a detecting portion detecting a maximum value of the outputs of the comparison part;

a signal generator generating a reference signal when the maximum value from the detecting portion is output;

a delay portion delaying the reference signal output from the signal generator for a certain time; and a switching portion setting delay time of the delay portion in response to outputs of the counter.

* * * * *